United States Patent
Zhang et al.

(10) Patent No.: US 9,946,395 B2
(45) Date of Patent: Apr. 17, 2018

(54) USER INTERFACE METHOD AND APPARATUS

(71) Applicant: Samsung Electronics Co., Ltd., Suwon-si (KR)

(72) Inventors: Chao Zhang, Beijing (CN); Xuetao Feng, Beijing (CN); Yang Liu, Beijing (CN); Chisung Bae, Yongin-si (KR); Sang-joon Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 15/016,673

(22) Filed: Feb. 5, 2016

(65) Prior Publication Data

US 2016/0239128 A1  Aug. 18, 2016

(30) Foreign Application Priority Data

Feb. 16, 2015 (CN) .......................... 2015 1 0083694
Sep. 21, 2015 (KR) ........................ 10-2015-0132868

(51) Int. Cl.
*G06F 3/041* (2006.01)
*G06F 3/048* (2013.01)
*G06F 3/01* (2006.01)
*G06F 3/0488* (2013.01)

(52) U.S. Cl.
CPC ............ *G06F 3/0416* (2013.01); *G06F 3/015* (2013.01); *G06F 3/0488* (2013.01)

(58) Field of Classification Search
CPC ....... G06F 3/0416; G06F 3/015; G06F 3/0488
See application file for complete search history.

(56) References Cited

U.S. PATENT DOCUMENTS

| | | | |
|---|---|---|---|
| 6,244,873 B1* | 6/2001 | Hill ......................... | G06F 3/015 379/110.01 |
| 6,965,842 B2* | 11/2005 | Rekimoto ............... | G06F 3/011 702/150 |
| 8,447,704 B2 | 5/2013 | Tan et al. | |
| 9,170,674 B2* | 10/2015 | Forutanpour ........... | G06F 3/014 |
| 2006/0121958 A1* | 6/2006 | Jung ........................ | G06F 3/015 455/575.1 |
| 2007/0140562 A1* | 6/2007 | Linderman ............ | G06K 9/222 382/187 |
| 2013/0063389 A1 | 3/2013 | Moore | |
| 2013/0265229 A1 | 10/2013 | Forutanpour et al. | |
| 2014/0210745 A1* | 7/2014 | Chizeck .................. | G06F 3/048 345/173 |
| 2014/0267084 A1* | 9/2014 | Krulce .................. | G06F 3/0416 345/173 |

FOREIGN PATENT DOCUMENTS

| | | |
|---|---|---|
| KP | 10-0897526 B1 | 5/2009 |
| KR | 10-0994408 B1 | 11/2010 |
| WO | WO 2011/055326 A1 | 5/2011 |

* cited by examiner

*Primary Examiner* — Ariel Balaoing
(74) *Attorney, Agent, or Firm* — NSIP Law

(57) ABSTRACT

A user interface method and apparatus are provided. A user interface method of a smart device includes receiving an electrical signal from an electromyography (EMG) sensor worn on a user, determining a user input based on the received electrical signal and position information about a determined position of a detected touch of the user on a touch screen, and controlling operation of the smart device in response to the determined user input.

20 Claims, 18 Drawing Sheets

Finger A: Input capital letter
Finger B: Input small letter

Finger A: Delete single letter symbol
Finger B: Delete single word
Finger C: Delete single phrase
Finger D: Delete single paragraph
Finger E: Delete whole document Finger A: Open contact information
Finger B: Call
Finger C: Send message Finger A: Open link
Finger B: Open link in new tab
Finger C: Store link Light touch:
Thin paintbrush tool
Heavy touch:
Thick paintbrush tool Light touch: Zoon in/out one time
Heavy touch: Zoon in/out plurality of times Finger A: Move
Finger B: Zoom in
Finger C: Zoom out
Finger D: Provide directions to location Light touch: Fast-forward/
fast-rewind at low speed Heavy touch: Fast-forward/
fast-rewind at high speed Finger A: Turn volume up
Finger B: Turn volume down Finger A: Play previous content
Finger B: Play next content Finger A: Perform general operation
Finger B: Return to previous state
Finger C: Return to home screen
Finger D: Open application menu Before application        After application

USER INTERFACE METHOD AND APPARATUS

CROSS-REFERENCE TO RELATED APPLICATION(S)

This application claims the benefit under 35 USC 119(a) of Chinese Patent Application No. 201510083694.4, filed on Feb. 16, 2015 in the State Intellectual Property Office of China, and Korean Patent Application No. 10-2015-0132868, filed on Sep. 21, 2015 in the Korean Intellectual Property Office, the entire disclosures of which are incorporated herein by reference for all purposes.

BACKGROUND

1. Field

The following relates to a user interface, and more particularly, to a user interface method and device.

2. Description of Related Art

A typical smart device, for example, a smartphone, a tablet personal computer (PC), or a wearable device implements a response to a user input by extensively using a developed touch screen technology, to provide a user interface. The touch screen may be any of, for example, a resistive touch screen, a capacitive touch screen, or a surface acoustic wave touch screen, as only examples. In comparison to an interface of a physical keyboard or mouse, a typical interface for the touch screen may be conveniently and intuitively manipulated using a typical virtual keyboard, for example, with a displayed figure or letter being selected by a touching of the displayed figure or letter, such as by any finger or stylus designed to interact with the touch screen. Thus, a typical input scheme using a touch screen of a typical smart device may allow a user to directly experience an interface through a typical virtual keyboard that mirrors the physical keyboard interface and through typical touch selections that mimic selection operations of the physical mouse interface.

When a touch is input to a touch screen by a user, the smart device typically detects position information of a position of the touch, and typically determines input information of the user with respect to the smart device based on the detected position information. The user may implement different operations using the touch screen based on various interactions, for example, using the typical virtual keyboard, a composite key, a double-tap, a long press, and a plurality of touches. For example, the user may edit a document by inputting a letter symbol using the typical virtual keyboard displayed on the touch screen, or may perform a zooming operation of a displayed image using a typical touch of a particular point or area of the screen controlling that operation or repeat such a zooming operation by repeating the touching of that particular point or area.

For convenience of a touch of the user, the typical virtual keyboard on the touch screen needs to have a minimum size that accommodates each of the different keys. Due to the minimum space or area of the touch screen occupied by the typical virtual keyboard, the effective remaining display area may be reduced. In addition, to implement composite key strokes that may have been implemented using a physical keyboard or a double-click of an item on the display that may have been implemented using physical mouse, the user typically needs to perform a plurality of touches or taps of the screen of the typical smart device. Also, an amount of time is required for the long press, and a plurality of fingers may be required for the different point touches with the typical smart device. Accordingly, it may be difficult to realize the above interactions on a relatively small screen.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

One or more embodiments provide a user interface method of a smart device, the user interface method including receiving an electrical signal from an electromyography (EMG) sensor worn on a user, determining a user input based on the received electrical signal and position information about a determined position of a detected touch of the user on a touch screen, and controlling operation of the smart device in response to the determined user input.

The method may further include identifying, with respect to the detected touch, at least one of which finger of the user is touching the touch screen and a touch strength of the finger touching the touch screen based on the received electrical signal, wherein the determining of the user input may include determining the user input based on the position information and at least one of the identified finger and the touch strength.

The EMG sensor may have a ring shape and the user input may be determined based on the electrical signal being sensed by the EMG sensor while worn on an arm of the user, and The EMG sensor may be configured to detect a potential waveform of a muscle of the arm, for the detected touch, and to output the electrical signal based on the detected potential waveform.

The method may further include training a classifier based on a previous electrical signal from the EMG sensor of a previous touching by the user. The identifying of the at least one of which finger is touching the touch screen and the touch strength may be based on the electrical signal and the trained classifier, and the training of the classifier may include extracting features of respective electrical signals sensed by the EMG sensor for touches of plural fingers of the user, acquiring a training sample by matching the extracted features to at least one of each of the plural fingers and respective touch strengths of the plural fingers, and training the classifier on identification of at least one of each of the touches of the plural fingers and the respective touch strengths, based on the training sample.

The determining of the user input based on the position information and the at least one of the identified finger and the touch strength may include determining which alphabet letter of a virtual keyboard displayed on the touch screen is touched by the user based on the position information, and determining, based on the identified finger, between the user input being a capital letter and a small letter of the alphabet letter.

The determining of the user input based on the position information and the at least one of the identified finger and the touch strength may include determining whether a delete key of a virtual keyboard displayed on the touch screen is touched by the user based on the position information, and selecting, based on the identified finger, the user input to be one of a requested deletion of a single letter or symbol, requested deletion of a single word, requested deletion of a single phrase, requested deletion of a single paragraph, and requested deletion of a whole document.

The determining of the user input based on the position information and the at least one of the identified finger and the touch strength may include determining, from plural contacts displayed in a contact interface on the touch screen, which contact is touched by the user based on the position information, and selecting, based on the identified finger, the user input to be one of requesting an opening of information of the contact, requesting the contact be contacted, and requesting a message be sent to the contact.

The determining of the user input based on the position information and the at least one of the identified finger and the touch strength may include determining, from one or more links of a browser interface displayed on the touch screen, which link is touched by the user based on the position information, and selecting, based on the identified finger, the user input to be one of requesting an opening of the link, requesting a storing of the link, and requesting an opening of the link in a new tab.

The determining of the user input based on the position information and the at least one of the identified finger and the touch strength may include determining, based on the position information, a painting or drawing operation location on the touch screen within a printing or drawing application interface displayed on the touch screen, determining, from one of a paintbrush tool and an eraser tool, which tool is selected by the user for the drawing operation based on the identified finger, and adjusting, depending on the selected tool, one of a thickness of the paintbrush tool and a size of the eraser tool, based on the touch strength.

The determining of the user input based on the position information and the at least one of the identified finger and the touch strength may include determining whether a zoom operation is initiated by the user for a map interface displayed on the touch screen based on the position information, determining, based on the identified finger, between the zoom operation being a zoom-in operation and a zoom-out operation, and determining an extent of the zoom operation based on the touch strength.

The determining of whether the zoom operation is initiated may be based on whether a zoom selection button displayed on the touch screen is touched by the finger.

The determining of the user input based on the position information and the at least one of the identified finger and the touch strength may include determining, based on the position information, whether a fast-forward operation or fast-rewind operation is initiated by the user for a media player interface displayed on the touch screen, and adjusting a speed of the fast-forward operation or the fast-rewind operation based on the touch strength.

The determining of whether the fast-forward operation or the fast-rewind operation is initiated may include determining whether a fast-forward or rewind button is touched by the finger, based on the position information.

When the fast-forward or rewind operation button is touched by the finger, the user input may be determined between the fast-forward operation and the fast-rewind operation based on the identified finger.

The determining of the user input based on the position information and the at least one of the identified finger and the touch strength may include determining whether a volume adjustment is initiated by a user for a media player interface displayed on the touch screen based on the position information, determining, based on the identified finger, between the volume adjustment being an increase in volume and a decrease in volume, and determining an extent of the volume adjustment based on the touch strength.

The determining of whether the volume adjustment is initiated may include determining whether a displayed volume button is touched by the finger, based on the position information.

The determining of the user input based on the position information and the at least one of the identified finger and the touch strength may include determining whether a content switch button for a media player interface displayed on the touch screen is touched by the user, based on the position information, and determining, based on the identified finger, between the user input being a request to playback a previous content and a request to playback a next content.

The determining of the user input based on the position information and the at least one of the identified finger and the touch strength may include determining the user input based on the position information when the identified finger is a predetermined finger associated with a particular input or operation of the smart device, and determining, based on the identified finger, between the user input being at least one of a request for the smart device to return to a previous state, a request for the smart device to return to a home screen, and a request for the smart device to open an application menu, when the identified finger is not the predetermined finger.

One or more embodiments provide a smart device including a communicator configured to receive an electrical signal from an electromyography (EMG) sensor worn on a user, and one or more processing devices configured to determine a user input based on the received electrical signal and position information of a determined position of a detected touch of the user on a touch screen, and to control operation of the smart device based on the determined user input.

The one or more processing devices may be configured to identify at least one of which finger of the user is touching the touch screen and a touch strength of the finger touching the touch screen based on the received electrical signal, and configured to determine the user input based on the position information and the at least one of the identified finger and the touch strength.

The EMG sensor may have a ring shape and the user input may be determined based on the electrical signal being sensed by the EMG sensor while worn on an arm of the user, and the EMG sensor may be configured to detect a potential waveform of a muscle of the arm, for the detected touch, and to output the electrical signal based on the detected potential waveform.

The smart device may further include a classifier trainer configured to extract features of respective electrical signals sensed by the EMG sensor for touches of plural fingers of the user, to acquire a training sample by matching the extracted features to at least one of each of the plural fingers and respective touch strengths of the plural fingers, and to train a classifier on identification of at least one of each of the touches of the plural fingers and the respective touch strengths based on the training sample, and the one or more processing devices may be configured to perform at least one of the identifying of which finger is touching the touch screen and the identifying of the touch strength using the classifier trained and based on the electrical signal.

Other features and aspects will be apparent from the following detailed description, the drawings, and the claims.

Figure 1:
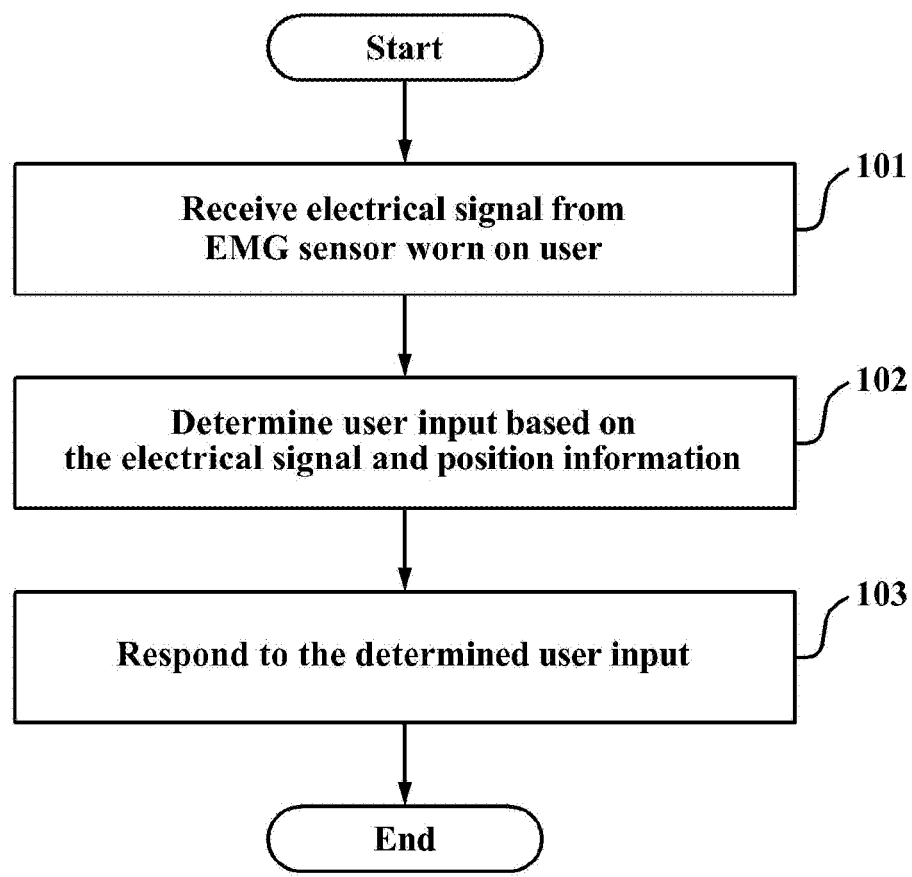
FIG. 1 is a flowchart illustrating a user interface method, in accordance with one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. After an understanding of the present disclosure, various changes, modifications, and equivalents of the methods, apparatuses, and/or systems described herein may then be apparent to one of ordinary skill in the art. The sequences of operations described herein are merely non-limiting examples, and are not limited to those set forth herein, but may be changed as will be apparent to one of ordinary skill in the art, with the exception of operations necessarily occurring in a certain order, after an understanding of the present disclosure. Also, descriptions of functions and constructions that may be understood, after an understanding of differing aspects of the present disclosure, may be omitted in some descriptions for increased clarity and conciseness.

Various alterations and modifications may be made to embodiments, some of which will be illustrated in detail in the drawings and detailed description. However, it should be understood that these embodiments are not construed as limited to the disclosure and illustrated forms and should be understood to include all changes, equivalents, and alternatives within the idea and the technical scope of this disclosure.

Terms used herein are to merely explain specific embodiments, thus it is not meant to be limiting. A singular expression includes a plural expression except when two expressions are contextually different from each other. For example, as used herein, the singular forms "a", "an", and "the" are intended to include the plural forms as well, unless the context clearly indicates otherwise. Herein, a term "include" or "have" are also intended to indicate that characteristics, figures, operations, components, or elements disclosed on the specification or combinations thereof exist. The term "include" or "have" should be understood so as not to pre-exclude existence of one or more other characteristics, figures, operations, components, elements or combinations thereof or additional possibility. In addition, though terms such as first, second, A, B, (a), (b), and the like may be used herein to describe components, unless indicated otherwise, these terminologies are not used to define an essence, order, or sequence of a corresponding component but used merely to distinguish the corresponding component from other component(s).

Unless otherwise defined, all terms including technical and scientific terms used herein have the same meaning as commonly understood by one of ordinary skill in the art to which respective embodiments belong. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

When describing the examples with reference to the accompanying drawings, like reference numerals refer to like constituent elements and a repeated description related thereto may be omitted. When it is determined that a detailed description related to an understood or previously discussed operation or configuration may make a purpose of a subsequent embodiment unnecessarily ambiguous in describing the embodiment, such a detailed description may be omitted.

FIG. 1 is a flowchart illustrating a user interface method, in accordance with one or more embodiments.

Referring to FIG. 1, in operation 101, an underlying device may measure or receive an electrical signal, or measurements or indications of the same, from one or more sensors that may distinguish between which finger(s) or other body elements(s) are being manipulated by a user and/or relative differences in pressure or emphasis being applied or given by any of such fingers or body elements of the user.

As only an example, the device may be a smart device, such as smart phone, smart tablet device, or smart wearable device, though embodiments are not limited to the same. The device may be a mobile device, though alternative embodiments are also available. The device may be any electronic device that implements, or controls an implementation, or an operation or service. As an alternative example, the device may an Internet of Things device, or a home automation device, that operates through a user interface, such as a touch screen or surface of the same, as only an example. Accordingly, though below examples may be discussed with regard to smart mobile devices, such discussions are also meant to be applicable for such alternative devices. Likewise, though embodiments below may be discussed with regard to a particular sensor technology, such as an electromyography (EMG) sensor that detects different muscle movements of a user, such discussions are also meant to be applicable to additional or alternative sensors that differently provide information that is used to discern which finger(s) or body element(s) of a user are currently being manipulated and/or relative differences in pressure or emphasis that are being applied by any of the finger(s) or body element(s).

Thus, as noted, in one or more embodiments, an EMG sensor may detect an action potential waveform of a portion of a user's body in which a corresponding muscle moves, convert the detected action potential waveform to an available electrical signal, and output the electrical signal. For example, when a user touches a touch screen with different fingers of the user, different action potential waveforms are generated in a portion of an arm in which a muscle moves. In this example, the EMG sensor may sense these different action potential waveforms and output the corresponding different electrical signals.

In one or more embodiments, when a user wearing such an EMG sensor touches a touch screen of a smart device, the smart device may determine a user input based on both an electrical signal output from the EMG sensor and position information on a position of a detected touch of the user on the touch screen, and may respond to the determined user input based on predetermined settings of the smart device, as only an example. In one or more embodiments, different user inputs may be interpreted based on which of different fingers the user touches a same item or area on the touch screen, which may reduce the number of required user inputs for the a selected operation compared to the number of user inputs needed with typical virtual keyboards or touch selections of a touch screen. Also, the smart device may allow the user to conveniently use a user interface of the smart device. In one or more embodiments, rather than needing a plurality of different keys in a typical virtual keyboard, a single displayed key may alternatively be used, and accordingly the effective display area of the touch screen may be expanded compared to the smart device's implementation of the typical virtual keyboard.

For example, in one or more embodiment, using the same virtual displayed key, a user may indicate a selection of a capital (or upper case) letter for the touched virtual key with a finger B, and indicate a selection of a small (or lower case) letter for the touched virtual key with a finger A. In this example, compared to a typical virtual keyboard that requires a separate virtual key for a toggling of the capital or small letter selection of the subsequently selected virtual key, in one or more embodiments the user may only need to touch one virtual key and is thereby provided with a convenient user interface of a smart device. Thus, with one or more embodiments, it is possible to provide a simple input scheme to the user compared to a situation of a typical virtual keyboard where a large number of inputs of both capital and small letters are required. Also, with one or more embodiments, it is possible to expand an effective area of a touch screen by not needing the extra virtual key for the capitals lock key, or additional virtual keys may now be available for display within the same area of the touch screen occupied by the typical virtual keyboard.

Referring back to FIG. 1, in one or more embodiments, a smart device may receive an electrical signal from an EMG sensor worn on a user, in operation 101.

The EMG sensor may be worn on an arm of the user, for example, at least one of a wrist, a forearm, and an upper arm of the user, as only examples. In such an example, the user touches the touch screen with a finger, the EMG sensor detects an action potential waveform of a portion of the arm in which a muscle moves and outputs the detected action potential waveform as an electrical signal.

For example, the EMG sensor may be worn on a portion of the arm, for example, on the forearm near a wrist or near the elbow. EMG sensors may be worn on both a portion of the forearm near to the wrist and a portion of the forearm near to the elbow. When EMG sensors are worn on a plurality of portions of the arm, the smart device may increase an accuracy of identification of which finger is touching the touch screen.

The EMG sensor may have a ring shape, as only an example. Here, the ring shape may provide a user with a comfortable fit. The EMG sensor may include a plurality of groups of electrodes distributed in the form of a ring. Thus, it may be possible to guarantee a high accuracy of identification of a finger.

Figure 2:
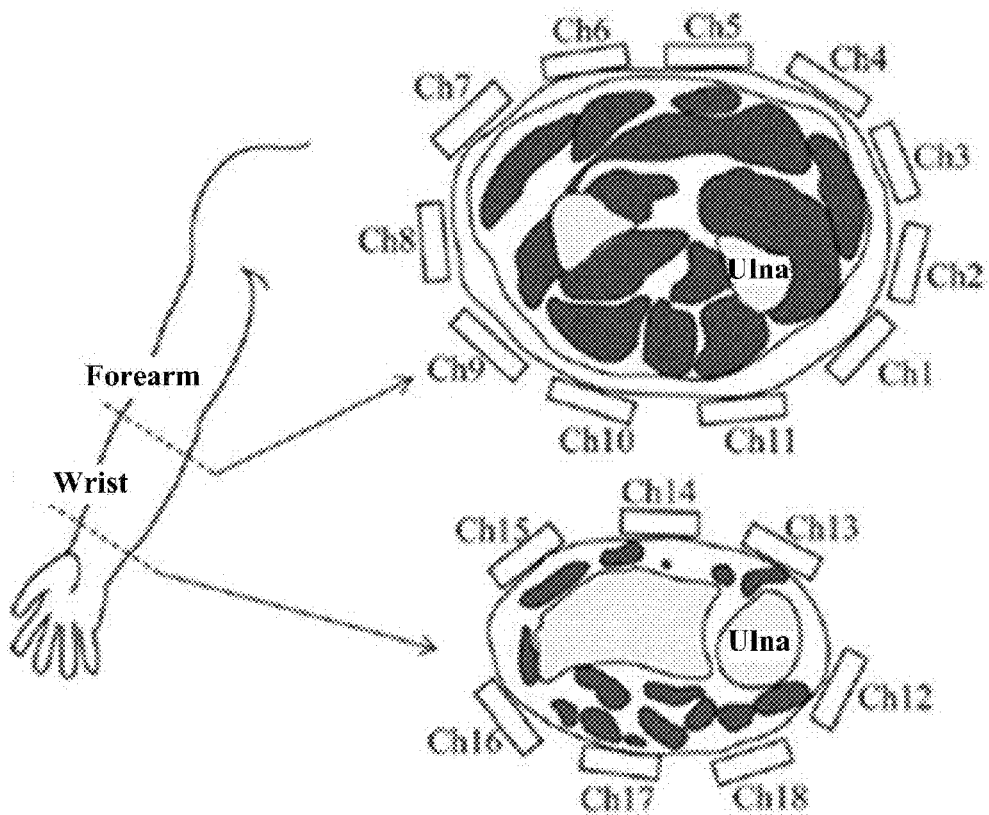
FIG. 2 is a diagram illustrating an electromyography (EMG) sensor that may be worn on a user, in accordance with one or more embodiments.

FIG. 2 illustrates an example of an EMG sensor that may be worn on a user, in accordance with one or more embodiments.

Referring to FIG. 2, an EMG sensor worn on a forearm nearer an elbow may include "11" groups of electrodes, for example, groups Ch1 through Ch11, and an EMG sensor worn on the forearm nearer a wrist may include "7" groups of electrodes, for example, groups Ch12 through Ch18.

For example, when the user touches a touch screen of a smart device with a finger, the smart device may receive an electrical signal from an EMG sensor worn on an arm. In one or more embodiments, each of the EMG sensors may include a wireless communicator, and may wirelessly transmit one or more electrical signals to the smart device using the wireless communicator. Depending on embodiment, the wireless communicator is configured to implement a Bluetooth communication scheme, as only an example, and includes a power supply, for example, a power supply using a battery.

Referring back to FIG. 1, in operation 102, the smart device may determine a user input based on the electrical signal and determined position information about a position of a detected touch of the user on the touch screen.

For example, by evaluating the electrical signal, the smart device may identify at least one of which finger of the user is touching the touch screen and a touch strength of the finger. The smart device may also use the determined touch screen position information of the detected touch of the user, e.g., detected by the smart device, in combination with the identified at least one of the finger and the touch strength to determine the user's intended input.

To identify which finger of the user is being manipulated to touch the touch screen, the smart device may use the following scheme. For example, the smart device may perform a filtering of the received electrical signal(s) (for example, filtering of a current change or voltage signal, e.g., to remove respective direct current (DC) components or to reduce noise in the respective electrical signals), may extract a feature (for example, a time domain and a frequency domain) from the electrical signal(s), and may select a feature (for example, a reduction in a feature dimension) from features of the electrical signal(s). For example, the smart device may identify which finger is being manipulated based on the selected feature.

Figure 3:
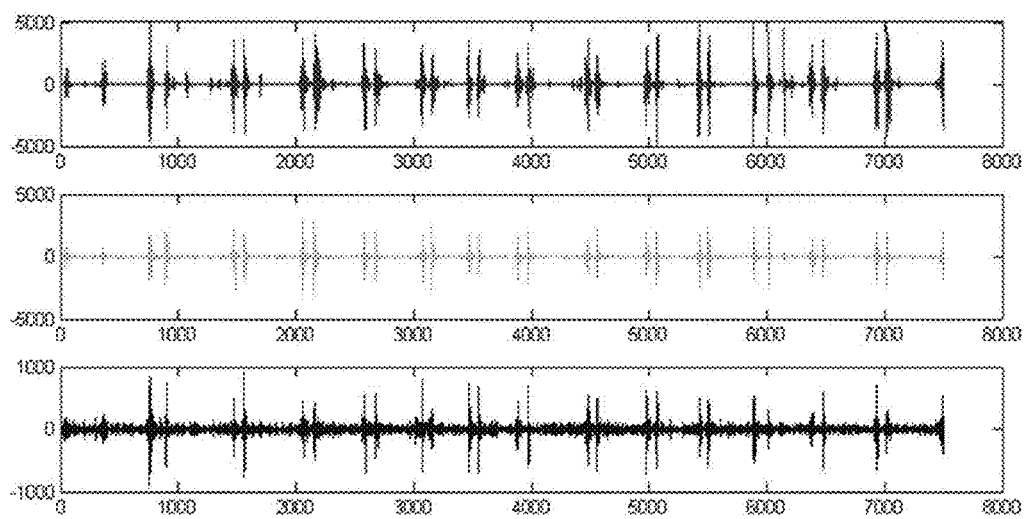
FIG. 3 is a diagram illustrating examples of waveforms of electrical signals collected by an EMG sensor, in accordance with one or more embodiments.

FIG. 3 illustrates examples of waveforms of electrical signals collected by an EMG sensor, in accordance with one or more embodiments.

A user interface method of a smart device, in accordance with one or more embodiments, may include an acquiring of such a waveform of an electrical signal collected and output by the EMG sensor. Here, the electrical signal may be an original electrical signal, e.g., before filtering has been performed on the electrical signal.

Figure 4:
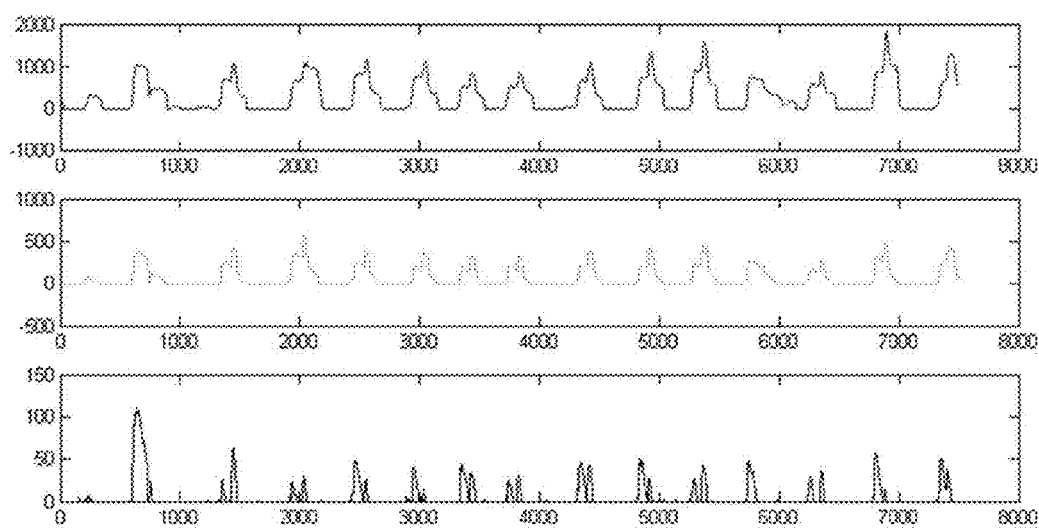
FIG. 4 is a diagram illustrating examples of waveforms of filtered electrical signals, in accordance with one or more embodiments.

FIG. 4 illustrates examples of waveforms of filtered electrical signals, in accordance with one or more embodiments.

A user interface method of a smart device, in accordance with one or more embodiments, may include an acquiring of such a waveform of an electrical signal obtained by filtering an electrical signal output by an EMG sensor, for example.

Figure 5A:
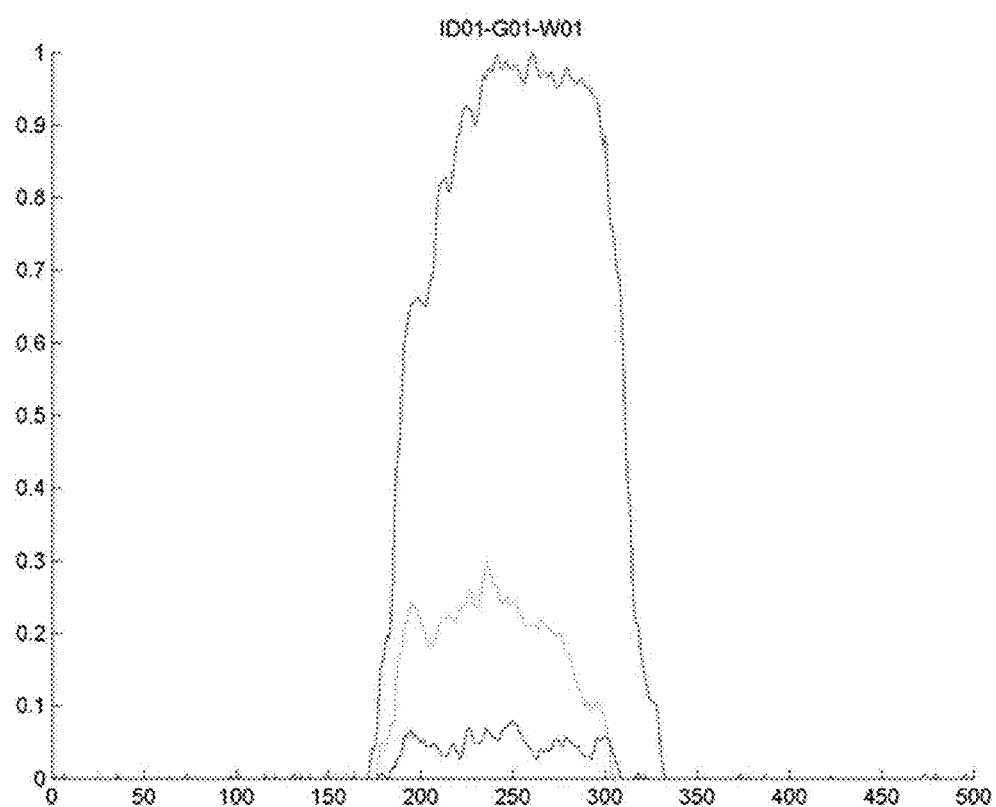
FIGS. 5A and 5B are diagrams illustrating examples of waveforms of electrical signals collected in response to touches of fingers on a touch screen, in accordance with one or more embodiments.
Figure 5B:
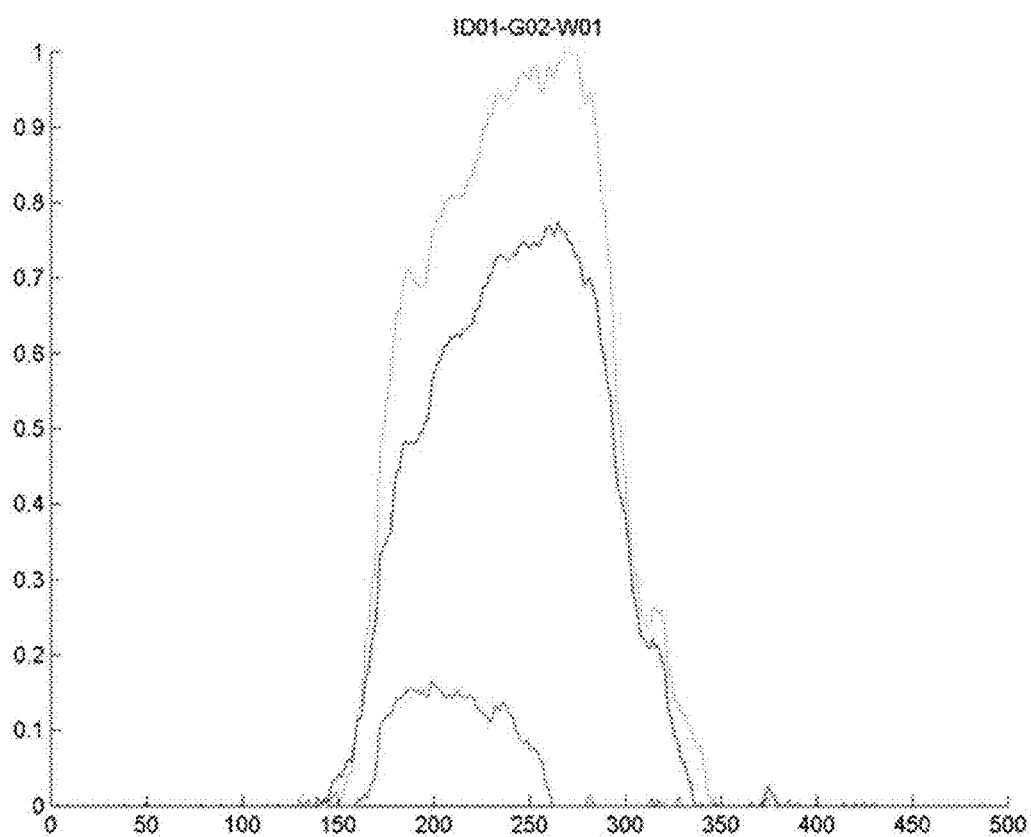

FIGS. 5A and 5B illustrate examples of waveforms of electrical signals collected in response to touches of a finger on a touch screen, in accordance with one or more embodiments.

For example, a user interface method of a smart device, in accordance with one or more embodiments, may include acquiring a waveform of an electrical signal collected and output by an EMG sensor, for example, when a user touches a touch screen with a finger A. The user interface method may include acquiring a waveform of an electrical signal collected and output by the EMG sensor when the user touches the touch screen with a finger B different from the finger A, for example. In FIGS. 5A and 5B, the horizontal axes and the vertical axes represent time and signal strength, respectively. In each of FIGS. 5A and 5B, three curves with different amplitude values represent waveforms of three electrical signals collected through three different paths by three groups of electrodes of the EMG sensor. The amplitude values and signal spectra are distinguished from each other.

In one or more embodiments, the user interface method may further include at least one classifier that is trained in advance, to help guarantee an accuracy of finger or pressure identification. For example, depending on embodiment, the smart device may identify, using the trained classifier, which finger is touching the touch screen or a corresponding touch strength of the finger touching the touch screen based on a received electrical signal. As a further example, the smart device may perform filtering of the received electrical signal, extract a feature from the received electrical signal, and select a feature of the received electrical signal, to identify at least one of the finger and the touch strength using the trained classifier(s).

Hereinafter, a scheme of training a classifier according to one or more embodiments is described, as only an example noting that alternative classifier training approaches are available.

A user may touch a touch screen with different fingers of the user, and the EMG sensor may respectively sense each of plural touches of the fingers on the touch screen. A corresponding feature of the respective electrical signal output from the EMG sensor may be extracted for each of the touches. A training sample may accordingly be acquired by matching the extracted feature to at least one of each of the fingers and a touch strength of each of the fingers. The classifier may be trained on identification of at least one of each of the fingers and the touch strength based on the acquired training sample. The classifier may be trained by, for example, a classifier trainer. Accordingly, in one or more embodiments, the smart device identifies each of the fingers or the touch strength using the trained classifier. In one or more embodiments, the smart device also includes the classifier trainer.

Figure 6:
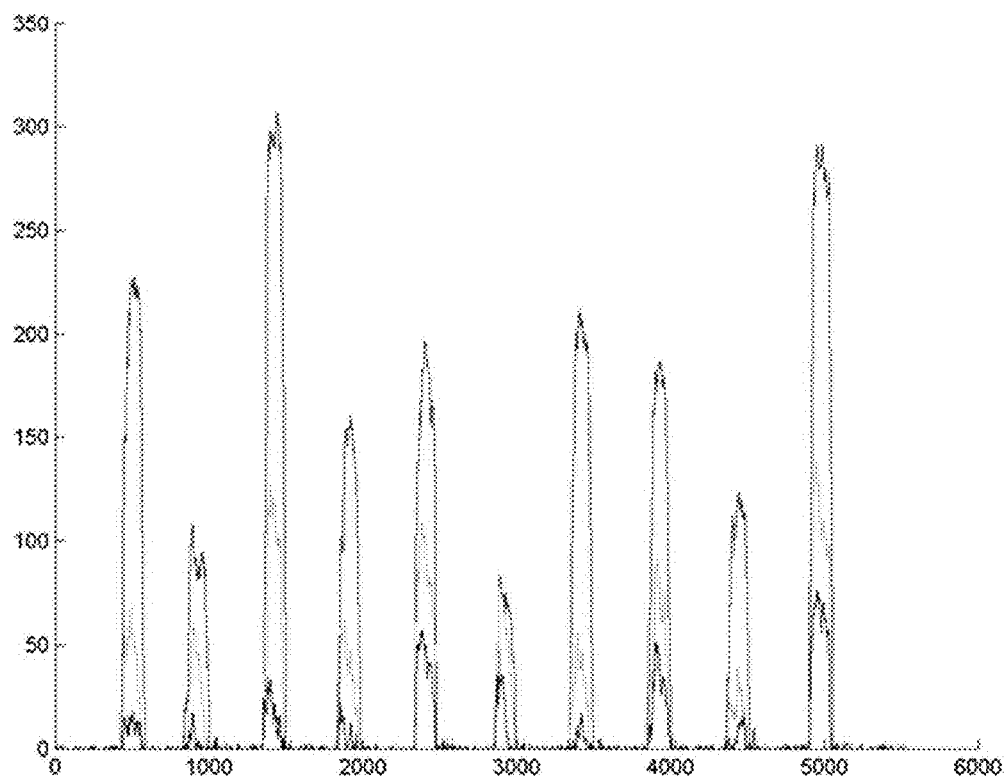
FIG. 6 is a diagram illustrating an example of waveforms of electrical signals output when different pressing forces are applied to a touch screen by the same finger, in accordance with one or more embodiments.

FIG. 6 illustrates an example of waveforms of electrical signals output when different pressing forces are applied to a touch screen by the same finger, in accordance with one or more embodiments.

Referring to FIG. 6, when a user touches a touch screen with the same finger using different pressing forces, respective features of the electrical signals output from an EMG sensor are different from each other. A smart device may determine the pressing force applied to the touch screen for a particular touch based on a corresponding received electrical signal. A pressing force applied to the touch screen by a finger is defined as a touch strength. FIG. 6 illustrates waveforms of electrical signals collected by the EMG sensor when the same finger touches the touch screen ten times. A wave crest of each of the waveforms represents a single touch. In the example of a plurality of touches with the same finger, electrical signals output from the EMG sensor have similar features, though with clearly different strengths, for example, amplitudes. Based on the electrical signals output from the EMG sensor, a touch strength of a finger touching the touch screen may be identified.

In one or more embodiments, the user interface method further includes using a classifier trained on identification on a touch strength of a finger to touch the touch screen, and may further include the training of the classifier by implementing a classifier training operation. Accordingly, in one or more embodiments, the smart device may identify the touch strength using the trained classifier.

Referring back to FIG. 1, in operation 103, the smart device may respond to the determined user input.

In one or more embodiments, the smart device may identify which finger is touching the touch screen and may determine whether there is a preset association between a predetermined finger and a particular operation, such as for an underlying application that is being executed by the smart device, that should be implemented by the smart device or particular user input that should be recognized for the smart device. For example, when the identified finger corresponds to the predetermined finger, the smart device may determine or infer the user input in accordance with the corresponding preset association in consideration of the corresponding position information about a position of the detected touch of the finger on the touch screen, and may accordingly determine what information is accordingly input or what operation of the smart device is to be implemented. When an association between the identified finger and a particular operation or user input has not been preset, the smart device may determine the user input merely based on the position information of the corresponding touch of the touch screen, for example.

Hereinafter, FIGS. 7-17 provide examples of smart devices implementing a user interface, according to one or more embodiments, based on an identification of which finger is touching a touch screen and/or a corresponding touch strength and a determination of the user's input by considering information about the identified finger and/or the identified touch strength along with position information about a position of a detected touch on the touch screen. Here, for each of the user interface examples it is noted that these are only examples and are not intended to limit the corresponding embodiments, but rather are illustrative of how additional or alternative embodiments may be implemented based on the same.

Figure 7:
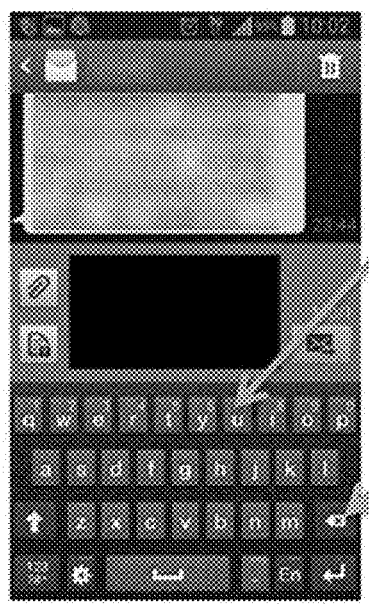
FIG. 7 is a diagram illustrating a user interface of a smart device providing a virtual keyboard, in accordance with one or more embodiments.

FIG. 7 illustrates a user interface of a smart device providing a virtual keyboard, in accordance with one or more embodiments.

As only an example, in FIG. 7, a virtual keyboard is displayed on a touch screen of the smart device, and the smart device is configured to determine an alphabet key touched by a user based on position information about a position of a touch of a finger of the user on the touch screen. Whether the touched alphabet key is for a capital letter or a small letter is determined based on which finger a user uses to touch the alphabet key.

As illustrated in FIG. 7, and only as an example, when a user touches an alphabet key with a finger A of the user, a capital letter may be determined as the user input. When the user touches the alphabet key with a finger B of the user, a small letter may be determined as the user input.

Generally, with a typical virtual keyboard, to enter a capital letter, the user touches a capitals lock key (for example, a shift key) and then touches an alphabet key corresponding to the capital letter. Also, with the typical keyboard, to enter a small letter after the capital letter is entered, the user must again touch the capitals lock key and then touch an alphabet key corresponding to the small letter.

In accordance with an embodiment, to enter a capital letter or a small letter, the user does not need to touch a capitals lock key, and a capitals lock key may actually not even be displayed for selection by the user in the virtual keyboard according to one or more embodiments. Thus, it is possible to provide a convenience of a user input and possible to facilitate a user input in a situation requiring an input of both capital and small letters. Also, the smart device does not need to display the capitals lock key, and thus it is possible to expend an effective display area of the touch screen.

In an embodiment, the virtual keyboard according to one or more embodiments may be displayed on a touch screen of the smart device according to one or more embodiments, and the smart device may determine whether a delete key is touched by a user based on position information about a position of a touch of a finger of the user on the touch screen, and further select one of a single letter symbol, a single word, a single phrase, a single paragraph, and a whole document to which the delete key is to be applied, based on a determination of which finger is being used to touch the delete key. Thus, the smart device determines the user input based on a result of the selecting.

As only an example, and as illustrated in FIG. 7, when a finger A of a preset user touches a delete key on the touch screen, a single letter symbol is deleted, when a finger B of the user touches the delete key, a single word is deleted, when a finger C of the user touches the delete key, a single phrase is deleted, when a finger D of the user touches the delete key, a single paragraph is deleted, and when a finger E of the user touches the delete key, the whole document may be deleted.

In accordance with one or more embodiments, to delete desired portions, inconvenience due to the typical virtual keyboard requirement that individual touches of the delete key be made may be avoided. In addition, in one or more embodiments a single letter symbol, a single word, a single phrase, a single paragraph, or a whole document may be conveniently and simply deleted using touch schemes distinguished by different fingers, compared to a typical user interface touch scheme of deleting a desired portion by dragging a cursor or highlighting the desired portion or by touching a delete key for a relatively long period of time. Thus, it is possible to provide a simplified user interface compared to the typical user interface touch schemes.

Figure 8:
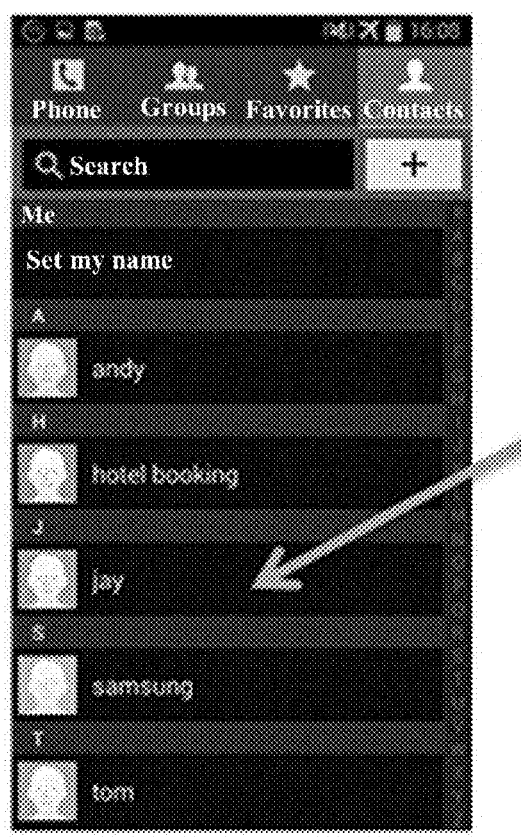
FIG. 8 is a diagram illustrating a contact interface of a smart device, in accordance with one or more embodiments.

FIG. 8 illustrates a contact interface of a smart device, in accordance with one or more embodiments.

For example, in a typical user interface contact scheme, when a contact interface is displayed on a touch screen of the smart device, the smart device determines a contact touched by a user based on position information about a position of a touch on the touch screen and then merely displays the corresponding contact information for that contact in response to that touch. In one or more embodiments, the smart device determines, as the user input, one of opening information of a contact, calling the contact, and sending a message to the contact, based on which finger is touching the touch screen. The smart device may then respond to the determined user input.

As illustrated in FIG. 8, and only as an example, when a finger A of a preset user touches a contact on the contact interface displayed on the touch screen, the smart device opens information of the touched contact, when a finger B of the user touches the contact on the contact interface, the smart device calls the touched contact, and when a finger C of the user touches the contact on the contact interface, the smart device sends a message to the touched contact.

In accordance with an embodiment, it is possible to avoid inefficiency due to the typical user interface contact scheme that requires separate actions to open information of a contact before implementing another operation to call the contact or to send a message to the contact. Rather, with one or more embodiments, it is possible to simply and conveniently open information of a contact, call the contact, and send a message to the contact, using touch schemes distinguished by different fingers with a single touch. Thus, a simplified user interface may be provided.

Figure 9:
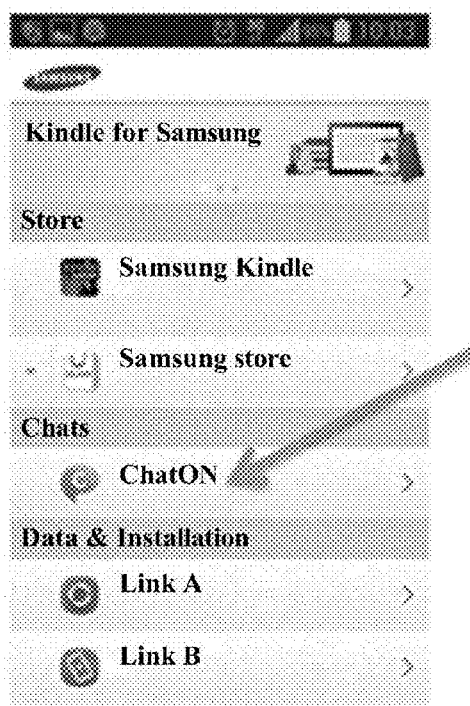
FIG. 9 is a diagram illustrating a browser interface of a smart device, in accordance with one or more embodiments.

FIG. 9 illustrates a browser interface of a smart device, in accordance with one or more embodiments.

For example, when a typical browser interface is displayed on a touch screen of a smart device, the smart device only determines a link touched by a user based on position information about a position of a touch of the touch screen. Rather, in one or more embodiments, and only as an example, the smart device may determine, as the user input, one of opening the link, storing the link, and opening the link in a new tab, based on which finger is touching the touch screen. The smart device responds to the user input.

As illustrated in FIG. 9, and only as an example, when a finger A of a preset user touches a link in a browser interface on the touch screen, the smart device opens the touched link, when a finger B of the user touches the link, the smart device opens the touched link in a new tab, and when a finger C of the user touches the link, the smart device stores the touched link.

In accordance with an embodiment, it is possible to simply and conveniently open a link, open the link in a new tab, and store the link, using touch schemes distinguished by different fingers. Thus, it is possible to provide a simplified user interface.

Figure 10:
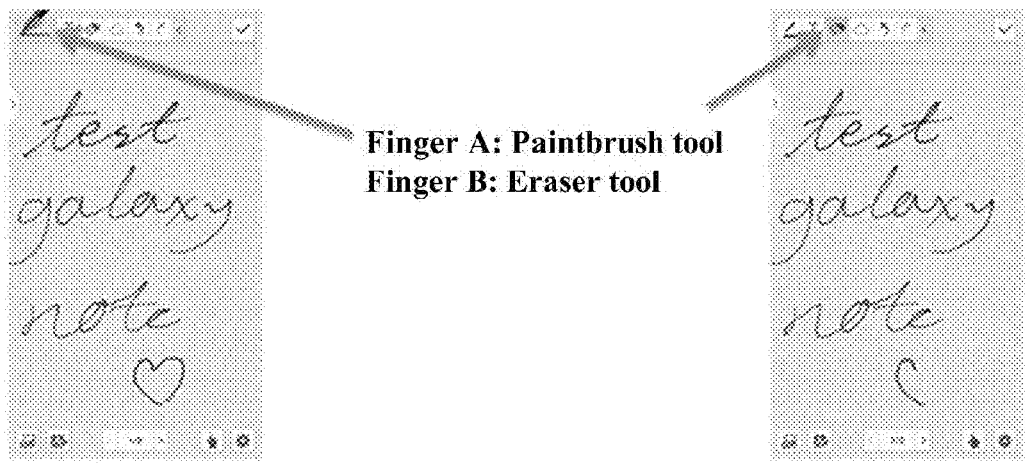
FIG. 10 is a diagram illustrating an interface of a smart device implementing a painting or drawing application, in accordance with one or more embodiments.

FIG. 10 illustrates an interface of a smart device implementing a painting or drawing application, in accordance with one or more embodiments.

For example, when a typical interface of a painting or drawing application is displayed on a touch screen of a smart device, the smart device determines a touch of a user on the interface of the painting application based on position information about a position of a touch of the touch screen, so a selecting of a tool and painting or drawing using that tool requires at least two separate touch determinations, one touch determination to select the tool typically between two separate tool buttons and another touch determination for the painting or drawing using that selected tool. However, in one or more embodiments and only as an example, the smart device may select between a paintbrush tool and an eraser tool for a determined touch based on which finger is touching the touch screen, so the tool selection could be implemented with a single button or no buttons at all, e.g., where the user interface is configured to select the appropriate tool and perform the painting operation with a single touching of the touch screen and the tool selection is dependent on which finger is used for the painting or drawing. In addition, in one or more embodiments and only as an example, the smart device may also adjust at least one of a thickness of the paintbrush tool and a size of the eraser tool based on the determined touch strength when either the paintbrush tool or the eraser tool is in use. The smart device responds to the determined touch.

As illustrated in FIG. 10, and only as an example, when a finger A of a preset user touches the interface of a painting application on the touch screen, the smart device determines that the user has selected to use a paintbrush tool for the touch of the finger A, while when a finger B of the user touches the interface of the painting application, the smart device determines that the user has selected to use an eraser tool for the touch of the finger B.

Figure 11:
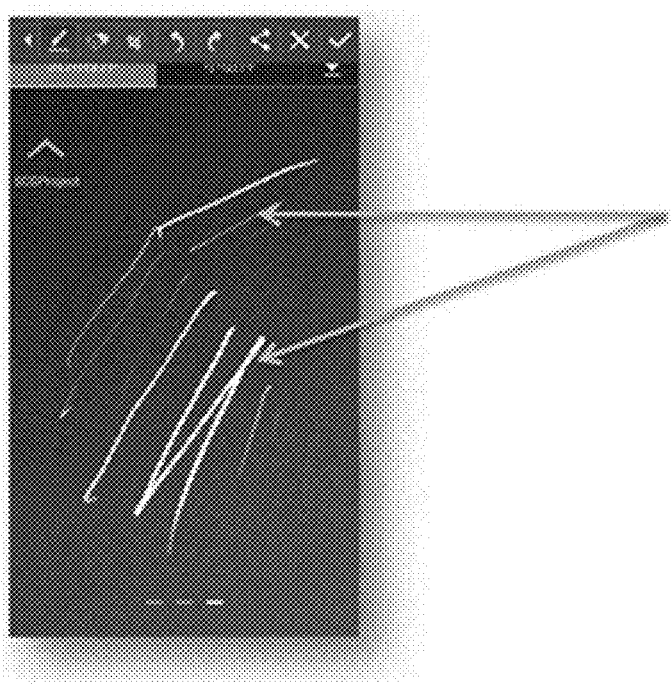
FIG. 11 is a diagram illustrating an interface of a smart device implementing a painting or drawing application that provides for an adjusting of a thickness of a paintbrush tool or a size of an eraser tool, in accordance with one or more embodiments.

FIG. 11 illustrates an interface of a smart device implementing a painting or drawing application that provides for an adjusting of a thickness of a paintbrush tool or a size of an eraser tool, in accordance with one or more embodiments.

Referring to FIG. 11, in one or more embodiments, a smart device adjusts the thickness of the paintbrush tool based on a touch strength of an identified finger when the paintbrush tool is in use. In an example, when a finger lightly touches the interface of the painting application, the smart device adjusts the paintbrush tool to be thin. In another example, when a finger heavily touches the interface of the painting application, the smart device adjusts the paintbrush tool to be thick. Similarly, the smart device adjusts the size of the eraser tool. A reference value of a touch strength used to determine the thickness of the paintbrush tool or the size of the eraser tool is set in advance, e.g., different thicknesses or sizes may be set to correspond to different values or ranges of detected touch strengths.

Figure 12:
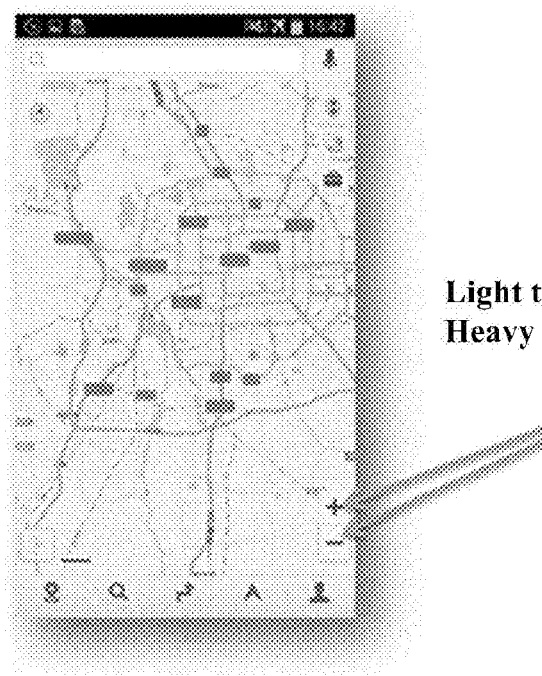
FIG. 12 is a diagram illustrating an interface of a smart device implementing a map application, in accordance with one or more embodiments.

FIG. 12 illustrates an interface of a smart device implementing a map application, in accordance with one or more embodiments.

As only an example, in one or more embodiments, the interface of a map application is displayed on a touch screen of the smart device, and the smart device determines to zoom in or out a map based on position information about a position of a touch of a finger of a user on the touch screen. The smart device determines a zoom level of the map based on a determined touch strength.

In another example, in one or more embodiments, an interface of a map application is displayed on a touch screen of a smart device, and the smart device determines whether a zoom-in key or a zoom-out key of the map application is touched by a user based on position information about a position of a touch of a finger of the user on the touch screen. The smart device determines to zoom in or out a map based on which key is touched. The smart device determines a zoom level of the map based on a touch strength. In still another example, in one or more embodiments, an interface of a map application includes a single key that represents both such a zoom-in key and zoom-out key. In this example, the smart device determines whether the single key is touched based on position information about a position of a touch of a finger of a user on the touch screen and may determine whether the input is a zoom-in or zoom-out instruction dependent on which finger is used to touch the single key.

As illustrated in FIG. 12, and only as an example, when a zoom-in key or a zoom-out key of an interface of a map application is lightly touched by a finger of a user, the smart device determines to respectively zoom in or zoom out of the map based on the finger, and may zoom in or out the map one time or one level. In another example with regard to FIG. 12, when the zoom-in key or the zoom-out key is heavily touched by a finger, the smart device determines to respectively zoom in or zoom out of the map based on the finger, and may zoom in or out the map a plurality of times or levels.

In accordance with one or more embodiments, touches of different fingers on the touch screen may be respectively set to correspond to different functions or operations of the smart phone, for example, moving a map, zooming in the map, zooming out the map, and providing directions to a corresponding location. Here, when the interface of a map application is displayed on the touch screen of the smart device, the smart device may determine a location of a map touched by a user based on position information about a position of the touch of the touch screen, and may further determine one of moving the map, zooming in the map, zooming out the map, providing directions to the determined location, and setting the determined location as a destination, as the user input based on which finger is determined to be touching the touch screen. Also, the smart device responds to the user input.

Figure 13:
FIG. 13 is a diagram illustrating an interface of a smart device implementing a map application, in accordance with one or more embodiments.

FIG. 13 illustrates an interface of a smart device implementing a map application, in accordance with one or more embodiments.

As illustrated in FIG. 13, in one or more embodiments and only as an example, when a finger A of a user touches an arbitrary location on the interface of a map application, the smart device moves a map to the touched location, when a finger B of the user touches the arbitrary location, the smart device zooms in the map, when a finger C of the user touches the arbitrary location, the smart device zooms out the map, and when a finger D of the user touches the arbitrary location, the smart device sets the touched location as a destination or provides directions to the touched location.

When a typical interface of a map application is displayed on a relatively small screen of a smart device and when finger touches are separately input to the screen to singularly zoom in or out a map, content displayed on the screen may easily overlap each other.

In accordance with one or more embodiments, a map displayed on a touch screen may be zoomed in or out using touches distinguished by different fingers, and thus it is possible to prevent overlapping of content on the screen and possible to provide a simplified interface.

Similarly, with a typical interface, when sensing of an input by an electromagnetic pen or stylus used by a hand is used as an interface, the electromagnetic pen or stylus is likely to be lost and the input by the electromagnetic pen or stylus is unnatural due to a low precision. Rather, in one or more embodiments, a zoom level of a map may be determined based on a determined touch strength of a finger to touch the touch screen, and thus it is possible to enhance a precision of an input and to provide a user with a natural, simple and convenient interface.

Figure 14:
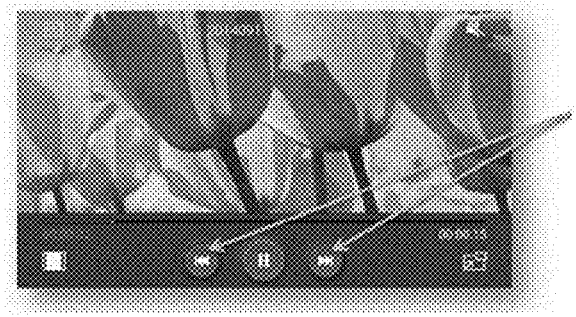
FIG. 14 is a diagram illustrating an interface of a smart device implementing a media player application, in accordance with one or more embodiments.

FIG. 14 illustrates an interface of a smart device implementing a media player application, in accordance with one or more embodiments.

In one or more embodiments, when the interface of a media player application is displayed on a touch screen of the smart device, the smart device determines whether a fast-forward button or a fast-rewind button is touched by a user based on position information about a position of a touch of a finger of the user on the touch screen, and adjusts a speed of fast forward or fast rewind based on a determined touch strength.

As illustrated in FIG. 14, and only as an example, when a fast-forward button or a fast-rewind button is determined to be lightly touched by a finger of a user, the smart device performs respective fast forward or fast rewind at a low speed, and when the fast-forward button or the fast-rewind button is heavily touched by the finger, the smart device performs respective fast forward or fast rewind at a high speed.

In one or more embodiments, a single button may be used instead of the separate a fast-forward and fast-rewind buttons. In this example, when an interface of the media player application is displayed on a touch screen of the smart device, the smart device determines whether the single button is touched by a user, e.g., based on position information about a position of a touch of the touch screen, and the smart device determines whether to perform fast forward or fast rewind based on which finger is determined to be touching the touch screen. The smart device may adjust a speed of either fast forward or fast rewind based on the touch strength.

Figure 15:
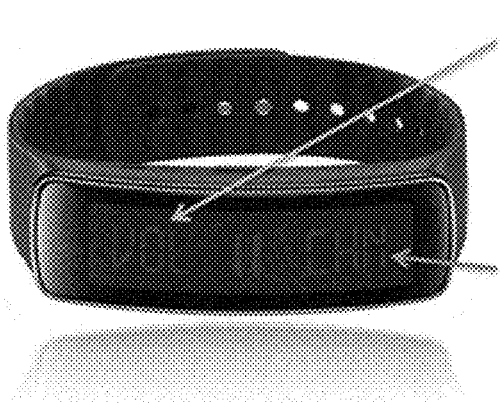
FIG. 15 is a diagram illustrating an interface of a media player, in accordance with one or more embodiments.

FIG. 15 illustrates an interface of a media player, in accordance with one or more embodiments.

In one or more embodiments, when the interface of the media player is displayed on a touch screen of the media player or corresponding smart device, the media player or smart device determines whether a volume key is touched by a user based on position information about a position of a touch of a finger of the user on the touch screen, and determines whether to turn a volume up or down based on which finger is touching the volume key. The media player or smart device may adjust a level of the volume based on the touch strength.

In one or more embodiments, when the interface of the media player is displayed on a touch screen of the media player or the smart device, the smart device determines whether a content switch key is touched by a user based on position information about a position of a touch of a finger of the user on the touch screen, and determines, as the user input, either a playback of previous content or a playback of next content based on which finger is pressing the content switch key. The media player or smart device responds to the user input.

As illustrated in FIG. 15, and only as an example, when a finger A of a user touches a volume key in response to the interface of the media player being displayed on the touch screen, the media player or the smart device turns a volume up, and when a finger B of the user touches the volume key, the media player or the smart device turns the volume down. In addition, when the finger A touches a content switch key in response to the interface of the media player being displayed on the touch screen, the media player or the smart device plays back previous content, and when the finger B touches the content switch key, the media player or the smart device plays back next content.

Figure 16:
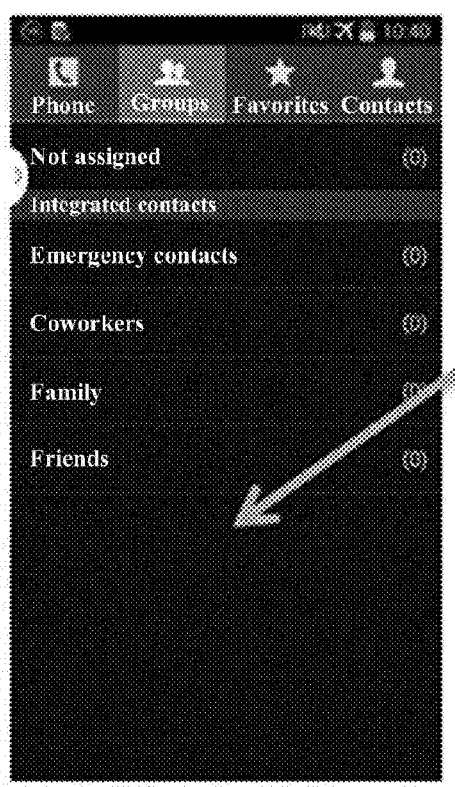
FIG. 16 is a diagram illustrating a user interface of a smart device, in accordance with one or more embodiments.

FIG. 16 illustrates a user interface of a smart device, in accordance with one or more embodiments.

In one or more embodiments, when an identified finger that is touching the touch screen is determined to corresponds to a predetermined finger that is set to perform set operation(s), the smart device determines a user input based on position information about a position of a touch of the identified finger on a touch screen and implements the set operation(s). When the identified finger does not correspond to the predetermined finger, the smart device determines, as the user input, at least one of returning to a previous state, returning to a home screen, and opening an application menu based on the identified finger, for example. The smart device responds to the user input.

As illustrated in FIG. 16, and only as an example, when a set finger A of a user touches the touch screen, the smart device determines a user input based on position information about a position of a touch of the finger A on the touch screen, and the smart device performs a general input based on the touch of the finger A. For example, the general input may include generating a new group, or selecting one of the displayed groups. When a finger B touches the touch screen, the smart device returns to a previous state, when a finger C touches the touch screen, the smart device returns to a home screen, and when a finger D touches the touch screen, the smart device opens an application menu.

The above-described examples are applicable to a smartphone, a smart tablet device, a smart wearable device, as only non-limiting examples.

In accordance with one or more embodiments, it is also possible to provide a further intuitive user interface by adding or displaying different marks to different buttons of a user interface on a touch screen or by indicating which fingers implement which operations for a particular button or buttons using different colors, for example.

Figure 17:
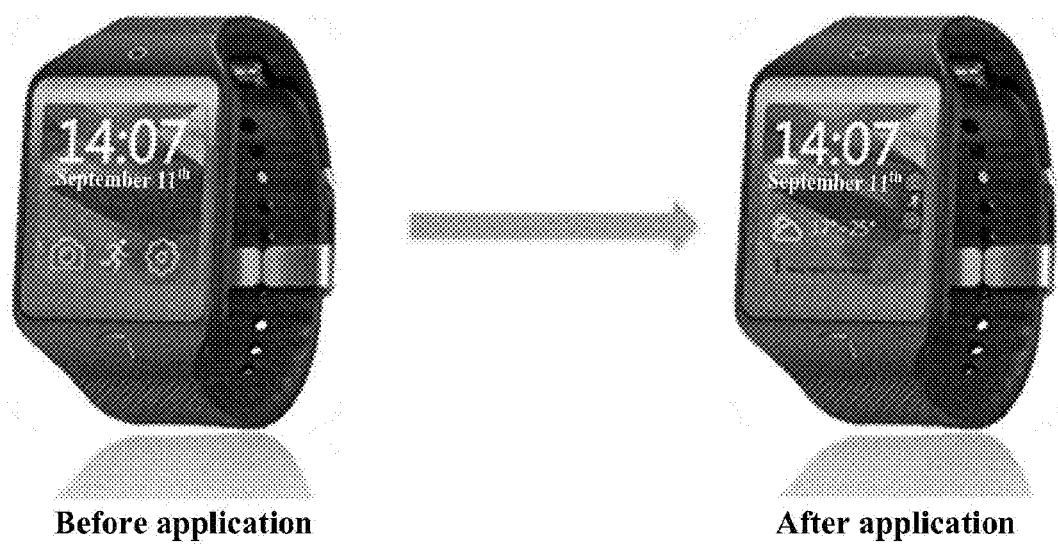
FIG. 17 is a diagram illustrating comparisons of respective effective areas of a display screen of a smart device, in accordance with one or more embodiments.

FIG. 17 illustrates comparisons of respective effective areas of a display screen of a smart device, in accordance with one or more embodiments.

As illustrated in FIG. 17, the left illustration illustrates a smart device where separate buttons are provided for separate touching by a user to implement the respective operations or display the respective information, while the right illustration illustrates a smart device according to one or more embodiments with a user interface that is implemented by finger identification. For example, with the right illustration, when a same portion of a touch screen is touched by different fingers, the smart device determines that different inputs have been made and different inputs or operations are implemented, so an effective display area of the touch screen may be expanded from the touch screen of the left illustration where display area is taken up by the separate buttons. Thus, as illustrated in FIG. 17, an effective display area of a touch screen is expanded by applying one or more embodiments described herein. In addition, in one or more embodiments, the smart device of the right illustration of FIG. 17 may determine a user input based on a touch strength in addition or alternatively to the finger identification.

Figure 18:
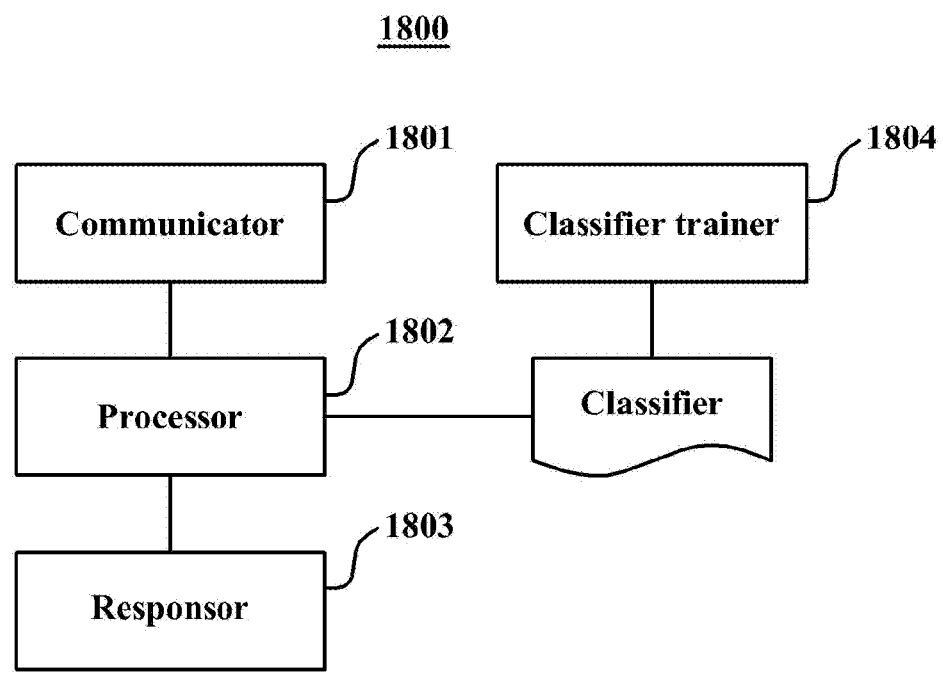
FIG. 18 is a block diagram illustrating a device with a user interface, in accordance with one or more embodiments.

FIG. 18 illustrates a device with a user interface, in accordance with one or more embodiments.

Any of the above-described user interface embodiments may be implemented by the device 1800 of FIG. 18, which may be, for example, a smart device. The device 1800 may include a touch screen that is controlled to display a user interface.

Referring to FIG. 18, the device 1800 may include a communicator 1801, a processor 1802, and a responsor 1803, for example.

The communicator 1801 may be a communication device that is configured to receive one or more electrical signals from one or more EMG sensors worn on a user, for example.

The processor 1802 may receive the electrical signal from the EMG sensor through the communicator 1801, determine the user input based on the electrical signal and position information about a position of the corresponding touch of the user on the touch screen, and respond to the determined user input using the responsor 1803. The processor 1802 may include one or more processing devices configured to implement any of the above described methods and user interface implementations.

Thus, the processor 1802 may identify at least one of which finger of the user is touching the touch screen and a touch strength of the finger, based on the one or more electrical signals, consider both position information and the identified at least one of which finger is touching the touch screen and the corresponding touch strength, and determine the user input based on a result of that consideration.

The responsor 1803 responds to the determined user input. The responsor may include one or more processing devices configured to implement operations of the device 1800, such as a processor of the a corresponding smartphone that controls execution of differing applications or programs of the smartphone, including a text editing application, a messaging application, a contacts application, a map application, a painting or drawing application, a health or exercise application, or a browser application, as only examples. The responsor 1803 and the processor 1802 may be a same processing device, or distinct processing devices.

Figure 19:
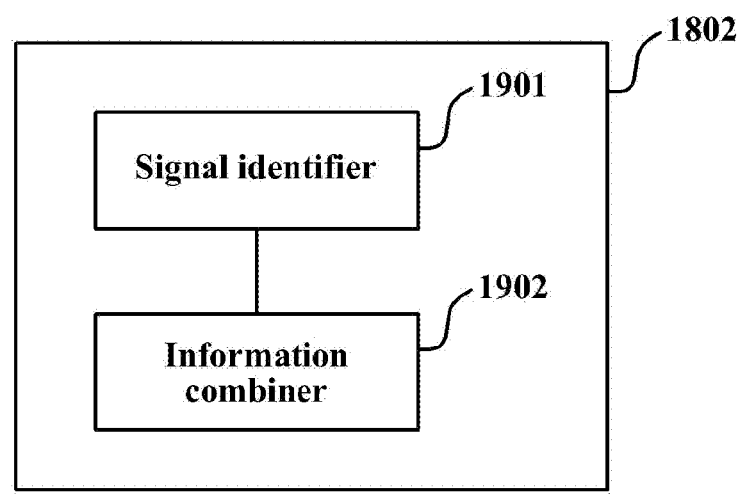
FIG. 19 is a block diagram illustrating a processor in a device with a user interface, such as the device of FIG. 18, in accordance with one or more embodiments.

FIG. 19 illustrates a processor of a device, such as the processor 1802 of the device 1800 of FIG. 18, according to one or more embodiments.

The processor 1802 may include a signal identifier 1901 and an information combiner 1902, for example.

The signal identifier 1901 may identify at least one of which finger of the user is touching the touch screen and a corresponding touch strength of the finger touching the touch screen, e.g., based on the one or more electrical signals received by the communicator 1801 and provided to the signal identifier 1901.

The information combiner 1902 may determine the user input based on the one or more electrical signals and position information about a determined position of a detected touch of the touch screen. The information combiner 1902 may consider both the position information and the identified at least one of the finger and the touch strength, and determine the user input based on a result of that consideration.

Referring back to FIG. 18, the device 1800 may further includes a classifier trainer 1804.

For example, to train the classifier, the classifier trainer 1804 may have a user touch a touch screen with multiple fingers and, when an EMG sensor senses each of the touches of the fingers, the classifier trainer 1804 may extract a feature of one or more electrical signals output from the EMG sensor for each of the touches. The classifier trainer 1804 may thereby acquire a training sample by matching the extracted feature(s) to at least one of each of the multiple fingers and may match a touch strength of each of the fingers. Accordingly, in one or more embodiments, the classifier trainer 1804 trains a classifier on identification of at least one of each of the touches and the touch strength based on the training sample.

Thus, the signal identifier 1901 may identify at least one of which finger is touching the touch screen and the touch strength using the trained classifier.

In an embodiment, the smart device 1800 further includes the EMG sensor. In this example, the EMG sensor is part of the communicator 1801 or installed as another communicator of the device 1800. In another embodiment, a user interface system includes the device 1800 and the separate EMG sensor.

Depending on embodiment, the device 1800 is configured to implement any or any combination of the above-described user interface methods, though not limited to the same.

In addition to the apparatuses, units, modules, elements, devices, and other components of FIGS. 2, 18, and 19 being hardware elements, any of which may implement any of the methods of FIGS. 1-17, as only examples, the methods of FIGS. 1-17 may be implemented by hardware components, including any above discussed example hardware elements that are included in an electronic device embodiment or a smart device embodiment. Examples of hardware components include, as only examples, resistors, capacitors, inductors, power supplies, frequency generators, operational amplifiers, power amplifiers, low-pass filters, high-pass filters, band-pass filters, analog-to-digital converters, digital-to-analog converters, controllers, sensors, generators, memory, drivers, circuitry, and/or any other electronic components known to one of ordinary skill in the art, configured to implement any of the above described methods of FIGS. 1-17, for example. In one or more examples, the hardware components, such as any of the components of FIG. 2, 18, or 19, are implemented by one or more processing devices, or processors, or computers. A processing device, processor, or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processing device, processor, or computer includes, or is connected to, one or more memories storing computer readable code, instructions, or software that are executed by the processing device, processor, or computer and that may control the processing device, processor, or computer to implement one or more methods described herein. Hardware components implemented by a processing device, processor, or computer, e.g., by implementing computer execute code, instructions, or software, such as an operating system (OS) and one or more software applications that run on the OS, may perform the operations described herein with respect to FIGS. 1-17, as only an example. The hardware components also access, manipulate, process, create, and store data in response to execution of the instructions or software. For simplicity, the singular term "processing device", "processor", or "computer" may be used in the description of the examples described herein, but in other examples multiple processing devices, processors, or computers are used, or a processing device, processor, or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, remote processing environments, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing. In addition, any connecting lines or connectors shown in the various above referred to apparatus figures are intended to represent example functional relationships and/or physical or logical couplings between the various hardware elements, with many alternative or additional functional relationships, physical connections, or logical connections may be present in a corresponding device embodiment.

The methods illustrated in FIGS. 1-17 that perform the operations described herein may be performed by a processing device, processor, or a computer as described above executing processor or computer readable code, instructions, or software to perform the operations described herein.

Processor or computer readable code, instructions, or software to control a processing device, processor, or computer to implement the hardware components and perform the methods as described above may be written as computer programs, code segments, instructions or any combination thereof, for individually or collectively instructing or configuring the processing device, processor, or computer to operate as a machine or special-purpose computer to perform the operations performed by the hardware components and the methods as described above. In one example, the processor or computer readable code, instructions, or software include machine code that is directly executed by the processing device, processor, or computer, such as machine code produced by a compiler. In another example, the processor or computer readable code, instructions, or software include higher-level code that is executed by the processing device, processor, or computer using an interpreter, such as implemented with any programming or scripting language such as C, C++, Java, assembler, or the like, with the various algorithms being implemented with any combination of data structures, objects, processes, routines or other programming elements. Based on the disclosure herein, and after an understanding of the same, programmers of ordinary skill in the art can readily write the processor or computer readable code, instructions, or software based on the block diagrams and the flow charts illustrated in the drawings and the corresponding descriptions in the specification, which disclose algorithms for performing the operations performed by the hardware components and the methods as described above.

The processor or computer readable code, instructions, or software to control a processing device, processor, or computer to implement the hardware components, such as discussed with regard to any of FIG. 2, 18, or 19, and perform the methods as described above with regard to any of FIGS. 1-17, and any associated data, data files, and data structures, are recorded, stored, or fixed in or on one or more non-transitory computer-readable storage media. Examples of a non-transitory processor or computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the processor or computer readable code, instructions, or software and any associated data, data files, and data structures in a non-transitory manner and providing the processor or computer readable code, instructions, or software and any associated data, data files, and data structures to a processing device, processor, or computer so that the processing device, processor, or computer can execute the instructions. In one example, the processor or computer readable code, instructions, or software and any associated data, data files, and data structures are distributed over network-coupled computer systems so that the instructions and software and any associated data, data files, and data structures are stored, accessed, and executed in a distributed fashion by the processing device, processor, or computer.

As a non-exhaustive example only, and in addition to any of the above explanations of potential hardware implementations of the devices or smart devices, an electronic device embodiment herein, such as described above with regard to any of 2, 18, and 19, and/or configured to implement the methods described with regard to any of FIGS. 1-17, may also be a mobile device, such as a cellular phone, a phone, a wearable device, a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication, including any Internet of Things devices or home automation devices.

While this disclosure includes specific examples, after an understanding of the present disclosure, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is not limited by the detailed description, but further supported by the claims and their equivalents, and all variations within the scope of the claims and their equivalents are to be construed as being included in the disclosure.

What is claimed is:

1. A user interface method of a smart device, the user interface method comprising:
    receiving an electrical signal from an electromyography (EMG) sensor worn on a user;
    identifying, with respect to a detected touch of the user on a touch screen, at least one of which finger of the user is touching the touch screen and a touch strength of the finger touching the touch screen based on the received electrical signal;
    determining a user input based on position information about a determined position of the detected touch of the user on the touch screen, and the at least one of the identified finger and the touch strength; and
    controlling operation of the smart device in response to the determined user input.

2. The user interface method of claim 1, wherein the EMG sensor has a ring shape and the user input is determined based on the electrical signal being sensed by the EMG sensor while worn on an arm of the user, and
wherein the EMG sensor is configured to detect a potential waveform of a muscle of the arm, for the detected touch, and to output the electrical signal based on the detected potential waveform.

3. The user interface method of claim 1, further comprising training a classifier based on a previous electrical signal from the EMG sensor of a previous touching by the user,
wherein identifying of the at least one of which finger is touching the touch screen and the touch strength is based on the electrical signal and the trained classifier, and
wherein the training of the classifier comprises:
extracting features of respective electrical signals sensed by the EMG sensor for touches of plural fingers of the user;
acquiring a training sample by matching the extracted features to at least one of each of the plural fingers and respective touch strengths of the plural fingers; and
training the classifier on identification of at least one of each of the touches of the plural fingers and the respective touch strengths, based on the training sample.

4. The user interface method of claim 1, wherein the determining of the user input based on the position information and the at least one of the identified finger and the touch strength comprises:
determining which alphabet letter of a virtual keyboard displayed on the touch screen is touched by the user based on the position information; and
determining, based on the identified finger, between the user input being a capital letter and a small letter of the alphabet letter.

5. The user interface method of claim 1, wherein the determining of the user input based on the position information and the at least one of the identified finger and the touch strength comprises:
determining whether a delete key of a virtual keyboard displayed on the touch screen is touched by the user based on the position information; and
selecting, based on the identified finger, the user input to be one of a requested deletion of a single letter or symbol, requested deletion of a single word, requested deletion of a single phrase, requested deletion of a single paragraph, and requested deletion of a whole document.

6. The user interface method of claim 1, wherein the determining of the user input based on the position information and the at least one of the identified finger and the touch strength comprises:
determining, from plural contacts displayed in a contact interface on the touch screen, which contact is touched by the user based on the position information; and
selecting, based on the identified finger, the user input to be one of requesting an opening of information of the contact, requesting the contact be contacted, and requesting a message be sent to the contact.

7. The user interface method of claim 1, wherein the determining of the user input based on the position information and the at least one of the identified finger and the touch strength comprises:
determining, from one or more links of a browser interface displayed on the touch screen, which link is touched by the user based on the position information; and selecting, based on the identified finger, the user input to be one of requesting an opening of the link, requesting a storing of the link, and requesting an opening of the link in a new tab.

8. The user interface method of claim 1, wherein the determining of the user input based on the position information and the at least one of the identified finger and the touch strength comprises:
determining, based on the position information, a painting or drawing operation location on the touch screen within a printing or drawing application interface displayed on the touch screen;
determining, from one of a paintbrush tool and an eraser tool, which tool is selected by the user for the drawing operation based on the identified finger; and
adjusting, depending on the selected tool, one of a thickness of the paintbrush tool and a size of the eraser tool, based on the touch strength.

9. The user interface method of claim 1, wherein the determining of the user input based on the position information and the at least one of the identified finger and the touch strength comprises:
determining whether a zoom operation is initiated by the user for a map interface displayed on the touch screen based on the position information;
determining, based on the identified finger, between the zoom operation being a zoom-in operation and a zoom-out operation; and
determining an extent of the zoom operation based on the touch strength.

10. The user interface method of claim 9, wherein the determining of whether the zoom operation is initiated is based on whether a displayed zoom selection button is touched by the finger, based on the position information.

11. The user interface method of claim 1, wherein the determining of the user input based on the position information and the at least one of the identified finger and the touch strength comprises:
determining, based on the position information, whether a fast-forward operation or fast-rewind operation is initiated by the user for a media player interface displayed on the touch screen; and
adjusting a speed of the fast-forward operation or the fast-rewind operation based on the touch strength.

12. The user interface method of claim 11, wherein the determining of whether the fast-forward operation or the fast-rewind operation is initiated includes determining whether a displayed fast-forward or rewind button is touched by the finger, based on the position information.

13. The user interface method of claim 12, wherein, when the fast-forward or rewind operation button is touched by the finger, the user input is determined between the fast-forward operation and the fast-rewind operation based on the identified finger.

14. The user interface method of claim 1, wherein the determining of the user input based on the position information and the at least one of the identified finger and the touch strength comprises:
determining whether a volume adjustment is initiated by a user for a media player interface displayed on the touch screen based on the position information;
determining, based on the identified finger, between the volume adjustment being an increase in volume and a decrease in volume; and
determining an extent of the volume adjustment based on the touch strength.

15. The user interface method of claim 14, wherein the determining of whether the volume adjustment is initiated includes determining whether a displayed volume button is touched by the finger, based on the position information.

16. The user interface method of claim 1, wherein the determining of the user input based on the position information and the at least one of the identified finger and the touch strength comprises:
   determining whether a content switch button for a media player interface displayed on the touch screen is touched by the user, based on the position information; and
   determining, based on the identified finger, between the user input being a request to playback a previous content and a request to playback a next content.

17. The user interface method of claim 1, wherein the determining of the user input based on the position information and the at least one of the identified finger and the touch strength comprises:
   determining the user input based on the position information when the identified finger is a predetermined finger associated with a particular input or operation of the smart device; and
   determining, based on the identified finger, between the user input being at least one of a request for the smart device to return to a previous state, a request for the smart device to return to a home screen, and a request for the smart device to open an application menu, when the identified finger is not the predetermined finger.

18. A smart device comprising:
   a communicator configured to receive an electrical signal from an electromyography (EMG) sensor worn on a user; and
   one or more processing devices configured to identify, with respect to a detected touch of the user on a touch screen, at least one of which finger of the user is touching the touch screen and a touch strength of the finger touching the touch screen based on the received electrical signal, determine a user input based on position information of a determined position of the detected touch of the user on the touch screen, and the at least one of the identified finger and the touch strength, and to control operation of the smart device based on the determined user input.

19. The smart device of claim 18, wherein the EMG sensor has a ring shape and the user input is determined based on the electrical signal being sensed by the EMG sensor while worn on an arm of the user, and
   wherein the EMG sensor is configured to detect a potential waveform of a muscle of the arm, for the detected touch, and to output the electrical signal based on the detected potential waveform.

20. The smart device of claim 18, further comprising a classifier trainer configured to extract features of respective electrical signals sensed by the EMG sensor for touches of plural fingers of the user, to acquire a training sample by matching the extracted features to at least one of each of the plural fingers and respective touch strengths of the plural fingers, and to train a classifier on identification of at least one of each of the touches of the plural fingers and the respective touch strengths based on the training sample,
   wherein the one or more processing devices are configured to perform at least one of identifying of which finger is touching the touch screen and identifying of the touch strength using the classifier trained and based on the electrical signal.

* * * * *